(12) United States Patent
Huang et al.

(10) Patent No.: US 10,746,582 B2
(45) Date of Patent: Aug. 18, 2020

(54) SENSING ANNULAR FLOW IN A WELLBORE

(71) Applicant: SCHLUMBERGER TECHNOLOGY CORPORATION, Sugar Land, TX (US)

(72) Inventors: Songming Huang, Cambridgeshire (GB); Colin Atkinson, Cambridgeshire (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 188 days.

(21) Appl. No.: 15/113,853

(22) PCT Filed: Jan. 24, 2015

(86) PCT No.: PCT/US2015/012796
§ 371 (c)(1),
(2) Date: Jul. 25, 2016

(87) PCT Pub. No.: WO2015/116504
PCT Pub. Date: Aug. 6, 2015

(65) Prior Publication Data
US 2016/0341587 A1  Nov. 24, 2016

(30) Foreign Application Priority Data
Jan. 29, 2014 (GB) .................................. 1401530.9

(51) Int. Cl.
*E21B 47/10* (2012.01)
*G01F 1/74* (2006.01)
(Continued)

(52) U.S. Cl.
CPC ................ *G01F 1/74* (2013.01); *E21B 47/00* (2013.01); *E21B 47/101* (2013.01);
(Continued)

(58) Field of Classification Search
None
See application file for complete search history.

(56) References Cited

U.S. PATENT DOCUMENTS 2,698,733 A * 1/1955 Schlumberger ......... E21B 47/00
166/264
2,853,788 A * 9/1958 Kinley .................... E21B 47/08
33/544.2
(Continued)

OTHER PUBLICATIONS

Huang, S. et al., "Electronic Transducers for Industrial Measurement of Low Value Capacitances", Journal of Physics E: Scientific Instruments, 1988, 21(3), pp. 242-250.
(Continued)

*Primary Examiner* — Jill E Culler

(57) ABSTRACT

Provided is a tool-body that arranges ultrasonic and electrical capacitance sensors at close distances to the casing wall of the wellbore such that properties of thickness, flow velocity, acoustic impedance and the dielectric constant of the liquid layer are measured at a number of circumferential locations inside the casing of the wellbore. These measured values may then be combined to derive the average flow rate of the layer and also used to identify whether the liquid is water or condensate/oil, or a mixture of the two with a certain water-in-liquid ratio. Combined with a gas flow rate and a liquid droplets concentration measurement, the total liquid flow rate and liquid type can be derived.

39 Claims, 12 Drawing Sheets

(51) Int. Cl.
    *G01F 1/66*  (2006.01)
    *E21B 47/00* (2012.01)
    *G01F 1/56*  (2006.01)
(52) U.S. Cl.
    CPC .............. *E21B 47/102* (2013.01); *G01F 1/56* (2013.01); *G01F 1/663* (2013.01)

(56) References Cited

U.S. PATENT DOCUMENTS

| | | | | |
|---|---|---|---|---|
| 3,808,697 | A * | 5/1974 | Hall ...................... | E21B 47/022 33/312 |
| 4,947,683 | A | 8/1990 | Minear et al. | |
| 5,631,413 | A * | 5/1997 | Young ................. | E21B 17/1021 73/152.21 |
| 5,633,470 | A * | 5/1997 | Song ......................... | G01F 1/74 73/152.42 |
| 5,736,637 | A * | 4/1998 | Evans ................... | E21B 47/102 73/152.18 |
| 7,114,386 | B1 * | 10/2006 | Veignat ................... | E21B 47/10 73/152.29 |
| 8,511,404 | B2 * | 8/2013 | Rasheed ................. | E21B 10/32 175/384 |
| 2006/0202700 | A1 * | 9/2006 | Barolak ................ | E21B 47/082 324/345 |
| 2011/0126636 | A1 | 6/2011 | Skripalle | |
| 2012/0063268 | A1 * | 3/2012 | Powell ...................... | G01F 1/74 367/89 |
| 2012/0186874 | A1 * | 7/2012 | Malone .................. | E21B 47/01 175/45 |
| 2012/0285233 | A1 * | 11/2012 | Maute .................. | E21B 47/011 73/152.29 |

OTHER PUBLICATIONS

Magrini, K. L., et al., "Liquid Entrainment in Annular Gas/Liquid Flow in Inclined Pipes", SPE 134765, presented at the SPE Annual Technical Conference and Exhibition, Florence, Italy, 2010, 16 pages.

Search Report and Written Opinion of International Patent Application No. PCT/US2015/012796 dated May 29, 2015, 15 pages.

International Preliminary Report on Patentability of International Patent Application No. PCT/US2015/012796, dated Aug. 11, 2016, 10 pages.

Combined Search and Exam Report of GB Patent Application No. 1401530.9, dated Aug. 5, 2014, 7 pages.

Further Exam Report of GB Patent Application No. 1401530.9, dated May 13, 2016, 3 pages.

\* cited by examiner

SENSING ANNULAR FLOW IN A WELLBORE

BACKGROUND

Embodiments of the present invention relate, generally, to the field of sensing the properties of a liquid layer in a downhole environment. More particularly, but not by way of limitation, some embodiments provide an apparatus and a method that includes an arrangement of a sensing means providing for measurement of the flow rate of a liquid annulus layer on a casing/tubing wall of a downhole section of a well/borehole.

When exploiting subterranean fluid deposits containing hydrocarbons, downhole services such as production logging ("PC") may be used to determine the properties within the wellbore. Such techniques ascertain the nature and behavior of fluids in or around the wellbore/borehole during production or injection. The data generated from production logging techniques, on further processing of the generated data, may be used to determine dynamic well performance and the productivity or infectivity of different zones within the wellbore/borehole, such that problem wells may be diagnosed, the results of stimulation within a well may be monitored and/or the like.

One technique common to a production logging is the use of a full-bore spinner, which when arranged as a first sensor in a production logging tool string, can measure, for example, the flow rate by means of the rate of rotation of the spinner. In essence, the spinner may form part of a flowmeter and may be used at different well depths to generate a flow profile for the well. Additionally, these flowmeters may be associated with borehole flow measurement sensors which may comprise electrical impedance sensors and/or optical probes. However, in determining the characteristics of the well, standardization of capability tends to approach a lowest common denominator, such that inaccurate measurements are generated when measuring thin liquid layers on the casing wall of the wellbore, which may, for example, be in the range of the order of millimeters thick.

As is generally known, in some flows, such as high gas flows or the like, a liquid layer on the casing wall of a well may be of the order of less than 10 millimeters, of the order of less than 5 millimeters or even of the order of less than 1 or 2 millimeters, with most of the liquid mass being in the liquid annulus with liquid droplets entrained in the gas core.

The gas/liquid flow regime in such flows is often annular with a gas core and a liquid annulus layer flowing on the production casing wall.

Moreover, a liquid layer of a liquid annulus in an annular flow often occurs in an oil or gas well having a high gas volumetric flow rate and low liquid fraction.

However, to obtain a signal representative of the flow rate of the liquid annulus on the casing wall that is both accurate and precise, sensors are required to contact the liquid to perform the measurement. In such a configuration, the sensors are likely to incur damage when placed too close to the casing wall.

That is, while techniques exist for measuring the flow rate of the gas core, even the liquid droplet concentration entrained in the gas, as in a wet gas flow, it remains a challenge to measure the flow rate of the annular liquid flow on the casing wall in an annular flow regime.

For example, U.S. Pat. No. 4,947,683 (Minear et al.) discloses a measuring device for use in a producing well comprising a sonde having upper and lower centralizers to define an annular flow space therearound. A motor driven sensor such as a piezoelectric combination transmitter and receiver is included to transmit and then receive ultrasonic pulses. They are transmitted downwardly from the housing into fluid flowing in the well. Reflective interfaces are defined by material differences. Gas bubbles droplets and particles in the fluid flow and phases between oil and water form reflective interfaces to create a scattering effect to transmitted ultrasonic pulses so that a return pulse is formed. The pulses encode fluid flow velocity as a result of the Doppler shift.

Similarly, U.S. Pat. No. 5,736,637 (Evans et al) discloses a system for evaluating multiphase flow of a fluid downhole in a borehole. Dielectric permittivity electrodes generate a capacitance output signal through the fluid, and conductivity electrodes generate a conductivity output signal through the fluid. The electrodes are powered with an alternating current (AC) generator operating at the same or different frequencies. The capacitance and conductivity output signals can be alternately generated by operating a controller, and such signals can be combined with a multiplexer engaged with the controller. The signal can be processed downhole or can be transmitted to a receiver positioned at the well surface for processing and interpretation of the multiphase data.

However, in both publications the use of the respective ultrasonic or capacitive sensors are only used in downhole measurements of non-annular flows and are thus only appropriate for flow regimes other than an annular flow regime.

Further, for an ultrasonic sensor, the propagation loss and the signal attenuation increases exponentially with the travel distance in the gas phase, (d), which is considered to be the distance between the sensor and the liquid layer. For a capacitance sensor, the measurement sensitivity is affected by the reciprocal of the distance, 1/d. However, placement of the sensors against the tubing wall would incur damage to the sensors.

Accordingly, a need exists to measure the velocity of the liquid layer without causing damage to the production logging sensors, such that a liquid production profile is generated for wells with an annular flow regime, and further the identification of condensate/oil and water.

Further, a need exists to determine what type of liquid is produced, and from which location within the well, so that the production of hydrocarbons from the well can be managed and/or accurately measured/assessed.

A further need exists to continuously measure the total flow rate of the liquid annulus on the casing wall that is both accurate and precise.

Furthermore and due to the variable environment within a wellbore and the different flow rates of the liquid at different locations within the bore, it is additionally required to calibrate the production logging tool that corrects for this variability.

SUMMARY

In embodiments of the present disclosure, these objects, among other things, may be achieved by using a production logging tool comprising a combination of two different types of non-contact sensors to provide a liquid production profile in wells with an annular flow regime and further providing an identification of condensate/oil and water.

Specifically, but not by way of limitation, in some embodiments a non-contact arrangement of ultrasonic and electrical capacitance sensors is disposed within the wellbore to make measurements of annular flow properties without making a connection to the casing.

In some embodiments, the ultrasonic and electrical capacitance sensors are placed at close distances to the casing wall of the wellbore by means of a tool such that properties of thickness, flow velocity and the dielectric constant of the liquid layer can be measured at a number of circumferential locations inside the casing of the wellbore. These measured values may then be combined to derive the average flow rate of the layer and also used to identify whether the liquid is water or condensate/oil, or a mixture of the two with a certain water-in-liquid ratio (WLR). Combined with a gas flow rate and a liquid droplets concentration measurement, the total liquid flow rate and liquid type can be derived.

Embodiments of the present disclosure provide a downhole annular flow meter tool for determining the flow rate of a liquid annulus of a well bore. The wellbore comprises a casing having a first surface and said tool comprises at least one sensor carrying arm adapted to extend from a tool body. In some implementations, the tool may be made of a metal having high conductive properties such that the tool may be used as an aid to the characterization of the well by means of being connected to an electronic circuit. The tool body may support at least one sensor support bar having a second surface, said surface being arranged in a predetermined distance opposite from the first surface of said casing. Further, said second surface of sensor support bar may be configured to carry a plurality of sensors that sense physical properties, including electrical properties and acoustic properties of the liquid annulus formed on the said first surface, at spatial locations close to the said annulus. In one embodiment, the distance between the first surface and the second surface wall is in the range of 2 and 10 mm which may allow for measurement of the flow rate of the annular liquid flow on the casing wall without damaging said sensors.

When the tool is in use, i.e. to characterize properties of the well, the surface of the casing is arranged parallel to the surface of the sensor support bar. Further, the sensor carrying arm comprises a proximal end movably fixed to said tool body and adapted to extend when said tool is inserted in a well bore. A distal end is adapted to attach to said at least one sensor support bar. In particular however, the sensor support bar is arranged between a distal end of a first sensor carrying arm and a distal end of a second sensor carrying arm extending from said tool body, such that the sensor support bar is stable and remains in a fixed position relative to the casing wall.

In one embodiment, at least one sensor is arranged on the sensor support bar a predetermined distance from the first surface of the casing. Alternatively or in addition, at least one sensor is integrated within the sensor support bar such that the set-up time of the tool is reduced compared to adapting a sensor support bar in the field. In some embodiments, several sensor carrying arms for supporting a plurality of sensors are provided that each extend from the tool body such that distinct measurements can be obtained depending on the requirements of the operative or the character of the well.

Further, the predetermined distance between said first surface of the casing wall and second surface of sensor bar is determined by at least one interval means, which is arranged on a distal end of the sensor carrying arm. In one embodiment, the interval means is a first wheel which is adapted to engage said first surface of the casing when said carrying arms are in the extended position. The wheel separates the active area of each sensor, arranged on the support bar, from the surface of the casing wall.

The interval means, which may comprise a wheel or the like, is adapted to rotate when the carrying arms are in the extended, i.e. deployed, position and when said tool traverses through the well bore. That is, the wheel as an interval means rotates about an axle point arranged on the arms such that the axle point is at a predetermined distance of the casing wall.

Moreover, the predetermined distance between the first surface and the second surface is constrained by a radius of said first wheel, rotating about an axle point. In another embodiment, the interval means may be a protrusion which extends from the distal end of said carrying arm. However, irrespective of the type of interval means, the purpose is the same, namely to allow the active surface area of each sensor to be at a predetermined and constant position relative to the casing wall, when the tool is in use to characterize the properties of the well.

Moreover, the distal end of each first sensor carrying arm and second carrying arm comprises at least one wheel of exact same dimensions to maintain said sensor support bar at a parallel distance determined by radius of said wheel. That is, since the sensor support bar is arranged between a first sensor carrying arm and a second carrying arm, each wheel arranged at the distal end thereof are of same dimensions. The tool may be fixedly attached to a production logging tool string, the length of said tool body being approximately 0.5 to 1.5 meters.

The tool body comprises a control unit for acquiring and analyzing data which is received from said at least one sensor and further a transceiver for bi-directional communication with a control station on a well surface. The control station comprises a user interface to allow an operative to control aspects of the operation such as the speed of deployment of the tool, the data type being collected, and, for example, the sample rate of data acquisition.

Further, arms are maintained at a predetermined and constant distance relative to the casing wall by means of an actuating signal from a CPU of an electronic instrumentation circuitry optionally positioned within the tool body or from a control station on a well surface such that the sensors are adaptively manipulated to be at a constant distance to the surface of the casing wall. Such a configuration may also extend in the event of either wheel arranged on separate arms wearing disproportionately to each other. That is, the arms may provide a compensatory effect on each sensor support arm in the event of a failing or failed wheel, to allow continued well characterization until an appropriate down time can be scheduled.

Several sensor types may be deployed such as ultrasonic transducers. Other sensor types may be capacitance sensors. The capacitance sensor may consist of two capacitor electrodes arranged on the same sensor carrying arm or arranged on separate carrying arms.

The ultrasonic transducers are adapted to emit towards a liquid layer on the casing wall a pulse to define an echo signal having an amplitude that travels through a gas phase between said transducers and the liquid layer. The CPU, located within an electronic instrumentation circuitry in the tool body or in a control station on a well surface, is adapted to use the arrival time or amplitude of the echo signal to determine the thickness of the liquid layer on the casing wall.

In use, at least one capacitance sensor may be deployed on the same sensing bars and further arranged a distance from the casing wall. The distance of any of the sensors from casing wall may be in the range of less than 10 mm to provide for measuring thin fluid flows on the annulus, such distance defined by the distal end of the first sensor carrying arm and the distal end of the second sensor carrying arm comprising said interval means.

Further, the capacitance between the sensor bar and casing wall may be indirectly measured by forming a three conductor sandwich capacitor whose capacitance value is equal to a first capacitor and second capacitor connected in series arranged on a sensor bar. That is, the casing wall is adapted to function as a central conductor in said three conductor sandwich capacitor, and wherein a reference ground is electrically isolated from tool ground of the metal body of the tool.

In some embodiments, a calibration sensor comprising a third surface may be optionally arranged between a distal end of a third sensor carrying arm and a distal end of a fourth sensor carrying arm. In particular however, the distance between the distal end of the third sensor carrying arm and the distal end of the fourth sensor carrying arm is less than the distance between the distal end of the first sensor carrying arm and the distal end of the second sensor carrying arm such that a gap may be in the range of the order of less than a millimeter or 0.25 and 0.5 mm between the sensor bars of third and fourth sensor carrying arm and casing wall. The gap is filled with liquid and the calibration sensor is adapted to measure ultrasonic impedance values as well as electrical permittivity values to identify liquid contact and to select ultrasonic and capacitance measurements to determine values of density, dielectric constant and water-in liquid ratio.

The measured values of ultrasonic and dielectric properties of the liquid may be used by a processor/CPU or the like of said electronic instrumentation circuitry or said control station, the processor may be adapted to combine the measurements from the measurements of liquid flow rates, water and oil/condensate derived by sensors deployed on any of the sensor bars.

The predetermined distance between said first surface of the casing and third surface is determined by at least one interval means such as a wheel optionally arranged on the distal end of the third sensor carrying arm or the fourth sensor carrying arm or both third and fourth sensor carrying arms. The wheel is configured to rotate about an axle point arranged on the arm and the axle point being at a predetermined distance to the casing wall, such that the data generated from the sensor can be used by either of the CPU's to determine an accurate and precise calibration value. The predetermined distance between the first surface and the third surface may be constrained by a radius of the second wheel being less than the distance between first surface and second surface.

Further described is a method for determining the flow rate of a liquid annulus of a well bore comprising the steps of (a) applying an ultrasonic Doppler sensor on a sensor bar to measure the average liquid annulus thickness at a downhole location, (b) using the ultrasonic Doppler sensor to measure the velocity of the gas/liquid interface and an estimate flow rate of the liquid annulus, (c) in combination with an ultrasonic Doppler sensor measured thickness, identifying a water-continuous or oil continuous layer of the liquid annulus using a ultrasonic Doppler sensor, (d) selecting for oil-continuous liquid, the water-in-liquid ratio of the liquid layer by a combination of the capacitance sensor and the ultrasonic Doppler sensor, (e) selecting for water-continuous liquid, the water-in-liquid ratio of the liquid layer by a combination of the ultrasonic Doppler sensor to measure the ultrasonic impedance, speed of sound and density measurements of the liquid layer, (f) using the ultrasonic Doppler sensor and the capacitance sensor to determine the liquid flow rate, water flow rate and oil flow rate, and further wherein step (f) additionally uses the signals from the ultrasonic Doppler sensor and the capacitance sensor with mixing laws and annular flow models and/or direct measurements.

The direct measurements described above may be generated by a full-bore spinner, a speed of sound sensor and/or the like.

BRIEF DESCRIPTION OF THE DRAWINGS

A better understanding of the features of the present invention will be obtained by reference to the following detailed description that sets forth illustrative embodiments by way of example only, in which the principles of the invention are utilized, and the accompanying drawings of which.

further arrangement of a capacitance measurement capable of being deployed on the tool body of the present invention.

Figure 9:
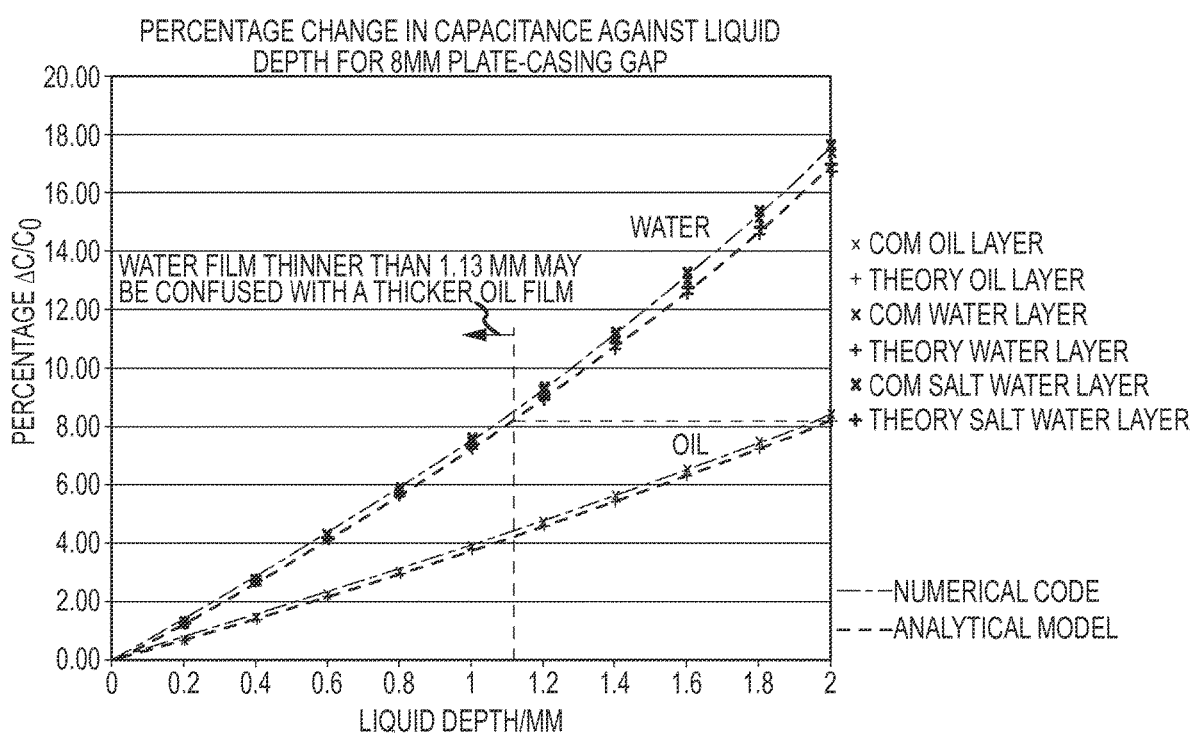
Figure 10:
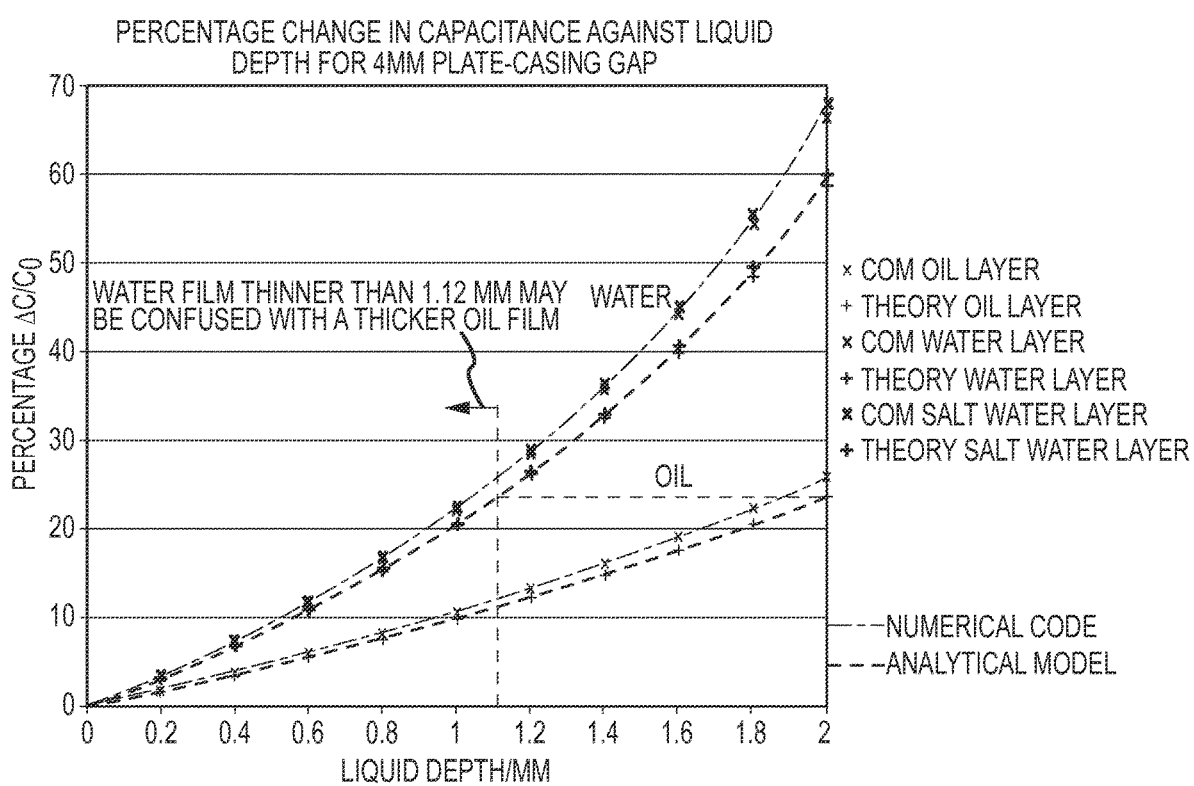

FIGS. 9 and 10 show the results of a simulation of the capacitance measured between two electrodes versus layer thickness of different liquids using a numerical model based finite element methods and analytical model based on an integral equation method.

Figure 11:
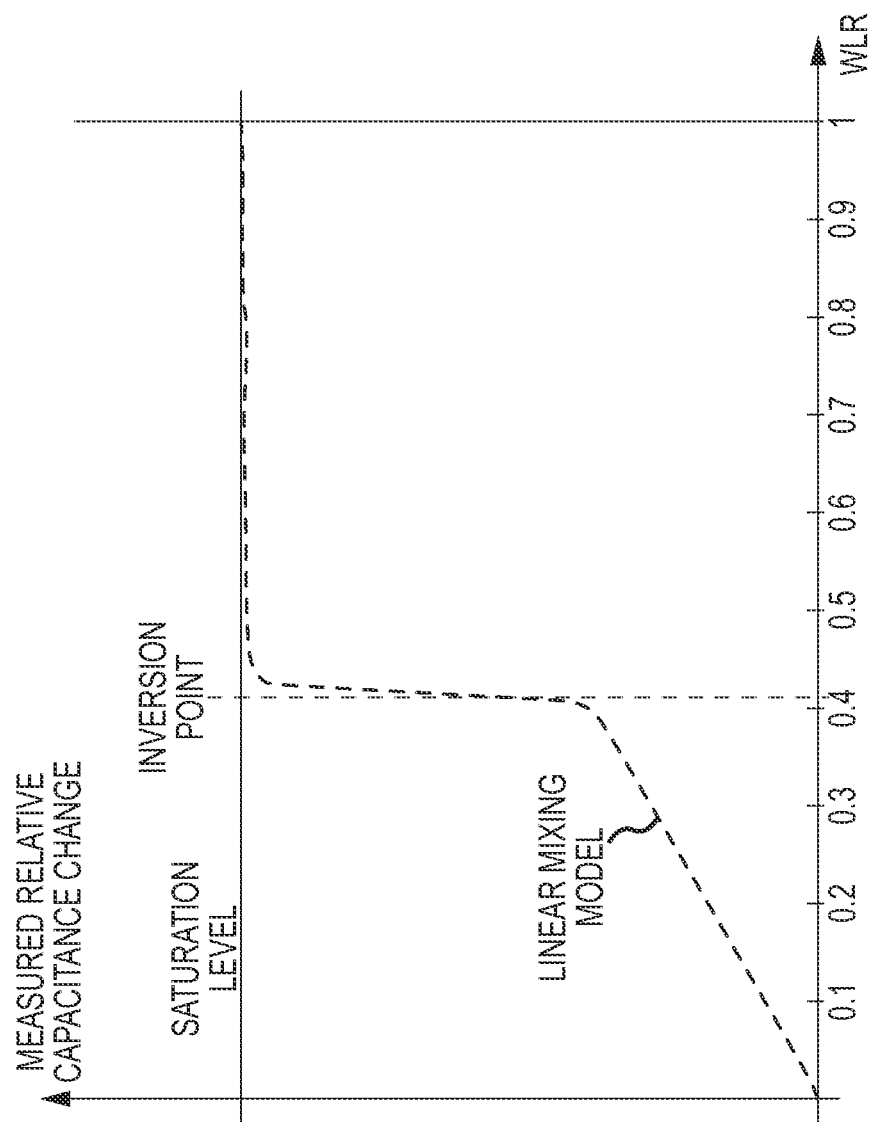

FIG. 11 shows a typical response of a capacitance sensor versus the water-in-liquid ratio assuming that the space between the electrodes is filled with a homogeneous oil/water mixture of varying water-in-liquid-ratio (WLR).

Figure 12:
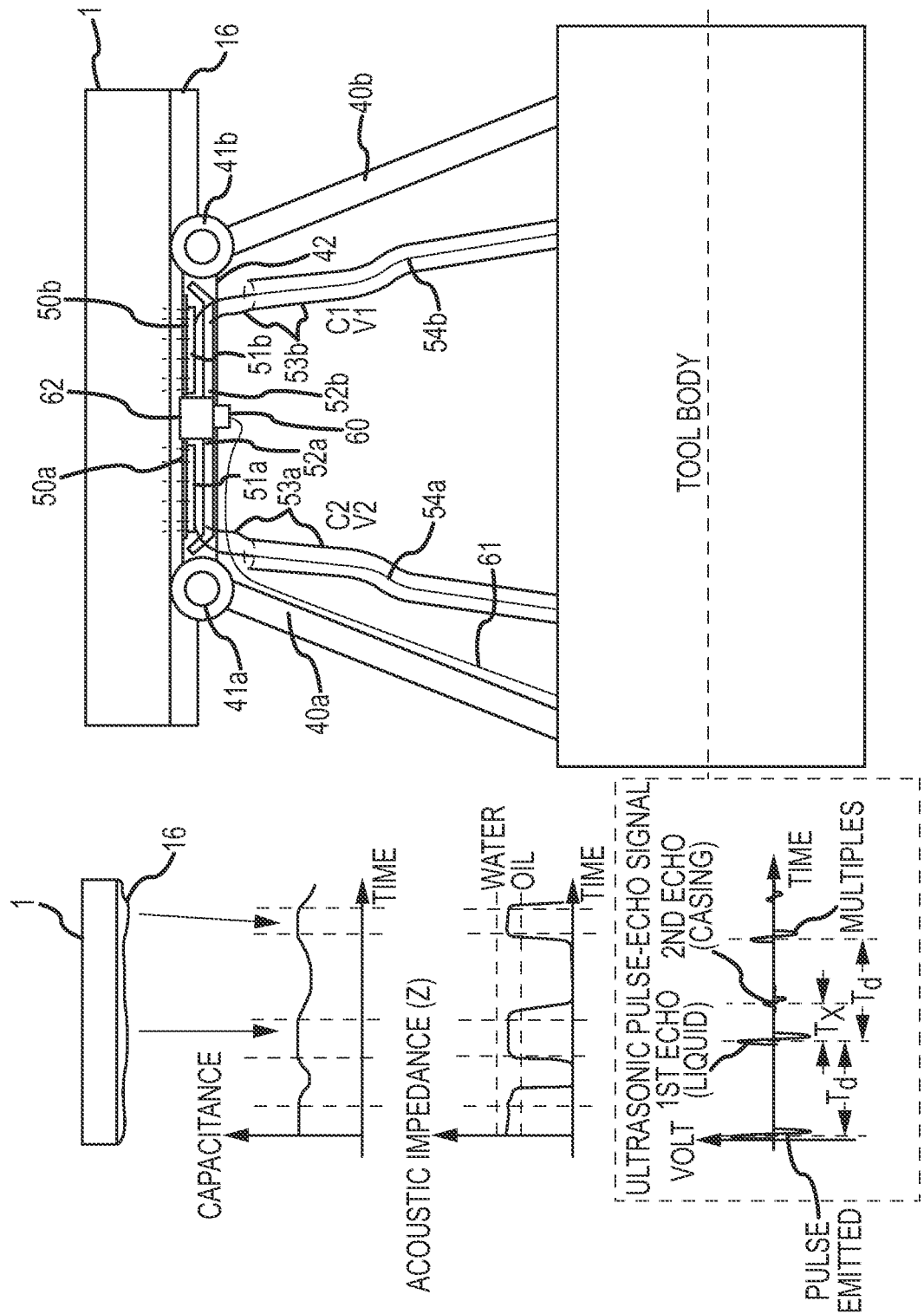

FIG. 12 shows a contact sensor bar providing an ultrasonic delay-line and capacitance electrodes in contact with liquid implemented by a gap or distance of several hundred microns between the sensors and the casing according to an embodiment of the present invention.

Figure 13:
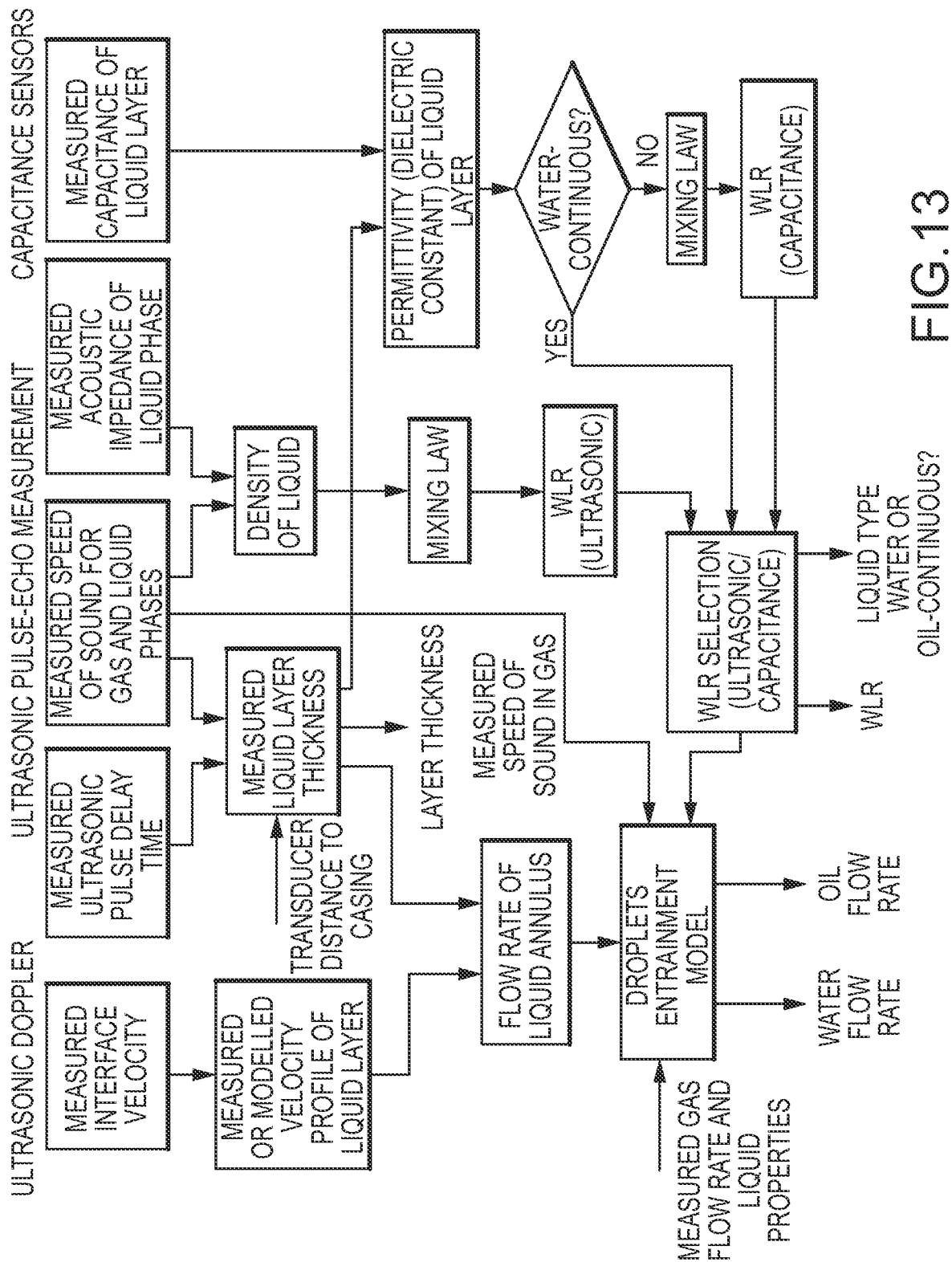
Figure 14:
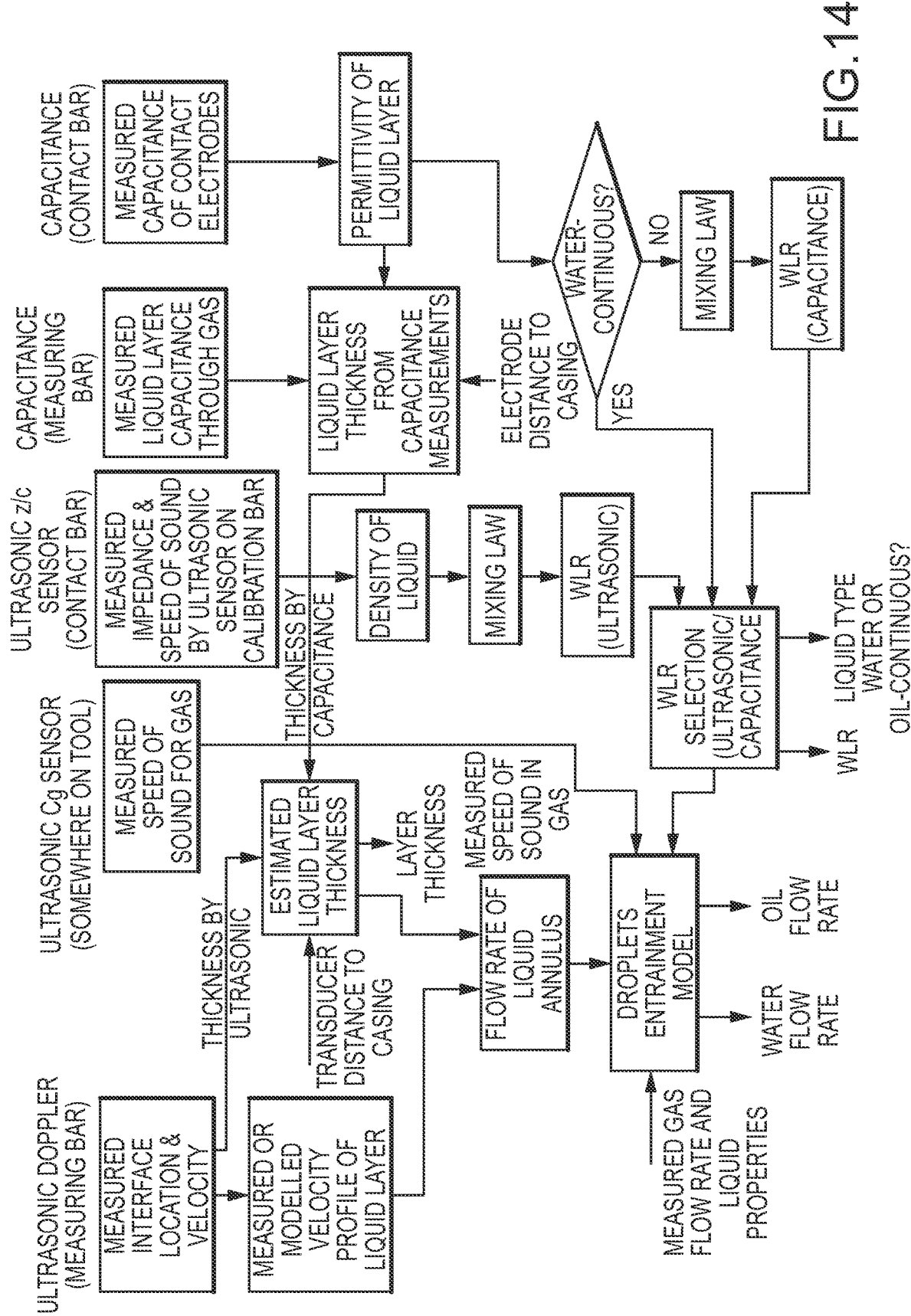

FIGS. 13 and 14 depict examples of the steps required to derive the flow information of the liquid annulus of a well bore using the measurements generated from each of the sensors e.g. ultrasound, capacitance and calibration sensor according to embodiments of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 2:
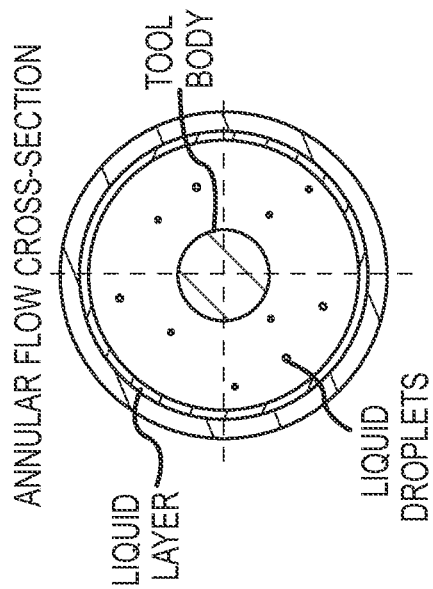
FIG. 2 shows a top view of a tool body arranged within a well bore having a casing.
Figure 1:
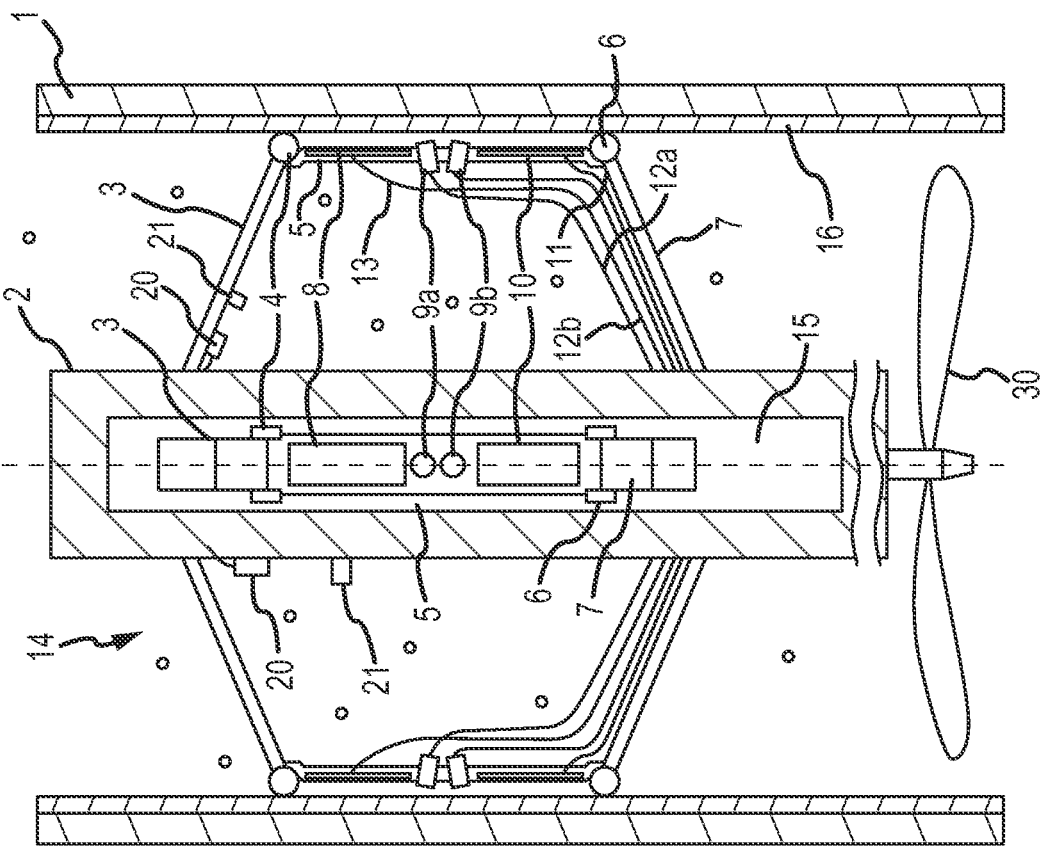
FIG. 1 shows a simplified schematic representation of a downhole annular flow meter tool positioned into a well bore having sensors deployed in a predetermined position according to an embodiment of the present invention.

FIG. 1 shows a simplified schematic representation of a downhole annular flow meter tool 2, made from metal, and forming part of a production logging system (not shown), and which is positioned in a wellbore. The tool comprises several sensors which are deployed in a predetermined position according to an embodiment of the present invention, as will be described later. Briefly referring to FIG. 2, the tool 2 is generally arranged concentric within the well bore and remains in a circumferential position with respect to the bore during well characterization. The well bore includes a metal casing wall 1 which defines a first surface on which a liquid layer 16 is provided. As will be discussed later, the metal casing wall may be used to further characterize aspects of the well.

Referring again to FIG. 1, the downhole tool 2 comprises a tool body comprising at least one, but in some aspects more than one, sensor carrying arms 3, 7. Each sensor carrying arm 3, 7 comprises an end proximal to the tool body, and an end which is distal to the tool body. Although not depicted in the current figure, each sensor carrying arm 3, 7 may be connected at the proximal end to the tool body by means of rotational joints allowing outward movement (from the tool body) and inward movement (towards the tool body). When passing through the wellhead, each arm slides along an axial guide 15 on the tool body 2 such that the entire arm collapses thereinto. Although the length of the tool can be variable depending on the properties of the well to be characterized, the length is generally defined as being longer than the maximum distance between arms 3, 7. Preferably, length of tool is approximately 1 meter. As would be readily understood, the diameter of the tool body is constrained by the diameter of wellbore which in general may be in the range of 63-76 mm, 76-152 mm 152-177 mm or the like.

Additionally, the proximal end of the sensor carrying arms may be further configured with a resilient means, such as a spring, to ensure an extendible configuration of the arms when positioned within a wellbore. Similarly, the arms may be retracted when the tool body is guided to position within the bore. In another, non-depicted configuration, pneumatic arms may be utilized which may controlled by an air compressor located within the tool body or connected by a suitable connection to an air compressor at the well surface (not shown). In yet another, non-depicted configuration, hydraulic arms may utilized and optionally controlled from the well surface. Alternatively or in addition, the tool body, by means of a fluid-tight seal, may house an electronic instrumentation circuitry to process data acquired from the sensors and send it to the well surface by means of a suitable interface. As can be further seen from FIG. 1, attached to the distal end of the arm, by means of additional rotational joints, is a sensor support bar 5 which provides an area for holding at least one sensor to facilitate a sensing surface. Each bar 5 has a length sufficient to allow mounting of several sensors thereon. However, the sensor support bars 5 may in addition or alternatively be manufactured with integrated sensors to reduce set-up considerations of the tool body in the field.

As can be envisaged, each sensor support bar 5 may be supported by one of support arms 3 or 7 or arranged between the distal ends of two or more of the support arms 3, 7 as shown in FIG. 1, attached by means of the rotational joints. Since the purpose of the arms is to provide stability to each sensor support bar, it is preferable that the bar 5 is disposed between a first distal end of a first support arm 3 and a distal end of a second support arm 7. Moreover, the surface of the sensor support bar, and thus the sensors are arranged opposite, at a predetermined distance, the surface of the casing 1. Thus, each support bar 5 is arranged in a parallel orientation to the wall surface of the casing. That is, the arms, whether under the control of spring(s), air, hydraulic or any other means, acts to provide a force sufficient to maintain each support bar, and thus the sensors at a constant distance, preferably parallel, to the surface of the casing wall 1. In other words, the sensors by means of said arms and a feedback configuration to control circuitry such as electronic instrumentation circuitry and/or from a control station on a well surface allow the sensors to be adaptively manipulated at a constant distance to the surface of the casing wall.

Further provided, and on the distal end of each arm are interval means 4 which protrude beyond the surface of the sensor support bar in the direction towards the surface of the casing wall 1. The interval means 4 may be configured as a protrusion that extends from the distal end of the arm to engage with a surface of the casing. However, due to the friction between the interface means and the casing surface during deployment of the tool, the protrusion would require replacement during regular service intervals. Therefore, the interval means may comprise a first wheel 4, which engages with the first surface of the casing 1 when the arms 3, 7 are in an extended position and, which rotates when the tool traverses through the well bore. The mean time between failure of a wheel compared to a protrusion would be longer since the effect of friction are minimized for the rotating wheel. Similarly, the wear on the wheel circumference and thus the diameter could be readily measured by known techniques.

The predetermined distance between the first surface of the casing 1 and the second surface of the bar 5 is constrained by the radius of the wheel. That is, and as can be understood from FIG. 1, the relationship between interval means 4 i.e. a wheel and bar 5 is maintained in an exact position in relation between arm 3 and well casing 1. Moreover, bar 5 is arranged parallel to the wall casing. In particular, the radius of the wheel(s) is greater than the interval between the surface of the casing 1 and the surface of the sensor bar 5. In other words, the circumference of the wheel during production logging extends beyond the surface of the sensors arranged, by means of the tool body, to the casing wall 1.

Furthermore, the interval means such as a wheel, is arranged a predetermined distance away from the sensors arranged on the sensor bar such that the interaction of the interval means 4 with the liquid layer on the surface of the casing wall does not affect the measurements readings processed, for example, by the electronic instrumentation circuitry positioned inside the tool body. That is, the distance of the sensor bar 5 and the sensors arranged thereon, or integrated therein, are kept constant with respect to the casing wall 1 by means of wheels 4. That is, said interval means 4 such as a wheel rotates about an axle point arranged on the arms, said axle point being kept at a predetermined distance from the casing wall.

In one configuration, and depending on the profile of the casing wall 1, the sensors may send a feedback signal to the electronic instrumentation circuitry signaling that the sensors are deviating from the casing wall due to the uneven surfaces thereof. Such signals may also be set to the electronic circuitry when the sensors are removed a distance from the casing wall due to deposits thereon. Consequently, the electronic instrumentation circuitry may send a signal to a controller of the arms to force the arms, and subsequently the sensors such to be maintained parallel and a predetermined distance to the casing wall. In other words, the electronic instrumentation may take a sample of readings from each sensor to calculate an average signal of the distance of the sensors from the casing wall for calibration of the tool. Such a configuration may also extend in the event of either wheel arranged on arms 3 or 7 wearing disproportionately to each other. That is, the arms may provide a compensatory effect for each sensor support arm in the event of a failing or failed wheel such that well characterization of the well may continue until an appropriate down time can be scheduled. In other words, the sensor active surface may be maintained a predetermined distance from the casing wall in the event of failed components such as an interval means.

To ensure the distance between the sensors and casing wall is maintained during characterization of the well, i.e. in an operational mode, each distal end of arms 3, 7 may comprise wheels of exact dimensions which rotate according to the relative position of the tool body such that the sensing surface of the sensors are maintained parallel at a predetermined distance to casing wall. Furthermore each arm distal end 3, 7 may comprise two wheels of exact dimensions arranged parallel to each other. That is, the two wheels can be considered as being in a general 'H' configuration having a commons axis arranged on the distal end of each arm. Other wheel configurations may also be considered such as a wheel having an axis of greater length than the outer contacting circumference, thus providing a stable configuration when the sensors are deployed.

Figure 3:
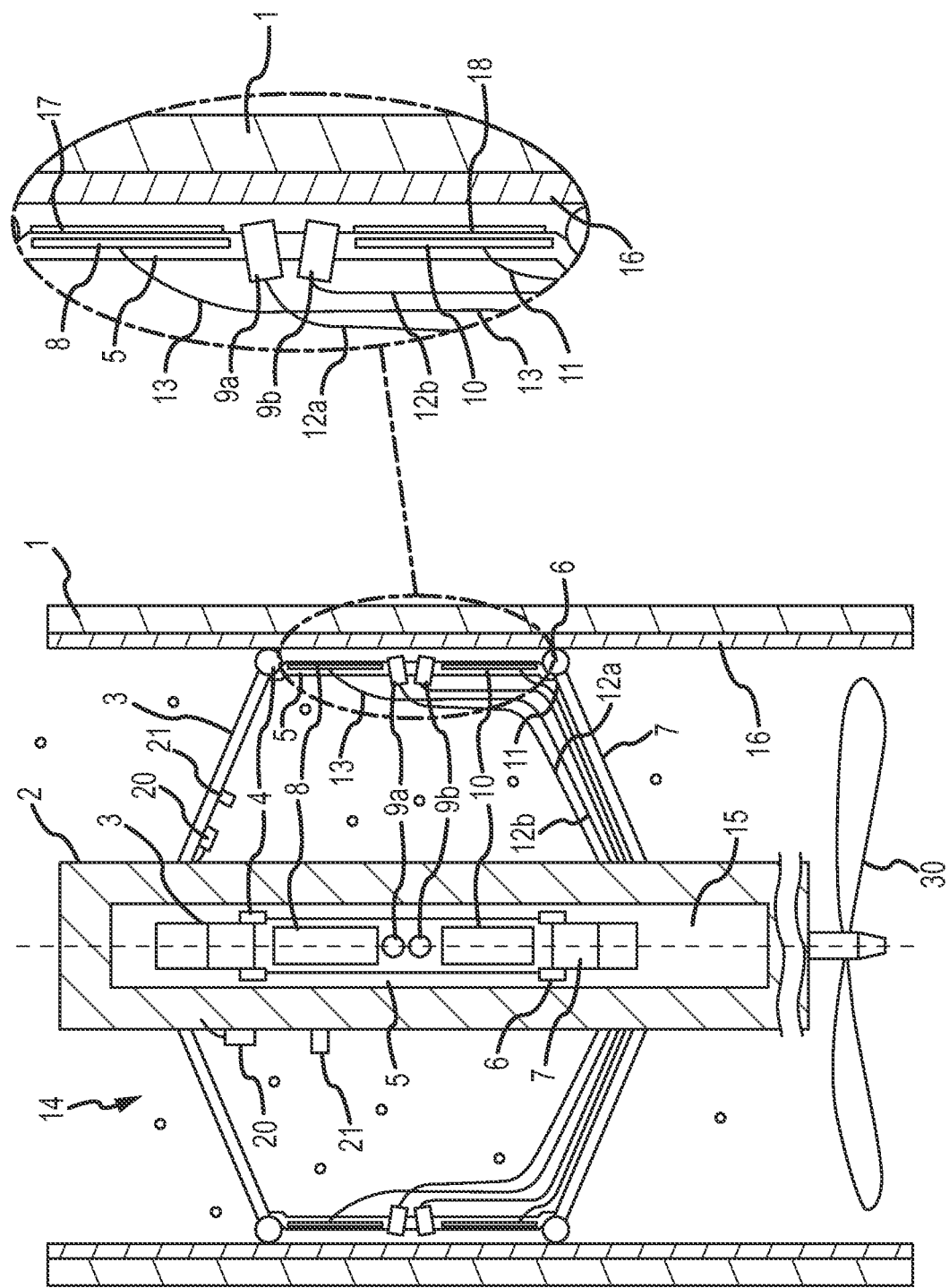
FIG. 3 shows a simplified exploded view of the deployed sensors of FIG. 1 according to an embodiment of the present invention.

FIG. 3 shows a simplified exploded view of the deployed sensors of FIG. 1, showing the sensor support bar 5, a pair of ultrasonic sensor probes 9a, 9b and two capacitance electrodes 8, 10, each of which is preferably protected by a thin layer of electrically insulating material. The second surface of the bar, namely the surfaces arranged opposite the surface of the casing wall, and thus the operational surfaces of the sensors are typically just a few millimeters from the first surface of the casing. As can further be seen in the FIG. 3, connection cables 11, 12, 13 to the ultrasonic sensor and the capacitance electrodes are attached to the sensor carrying arm 3, 7, and connected to the electronic instrumentation circuitry positioned inside the tool body.

Whilst FIG. 3 only depicts only two sensors placed by means of the sensor support bar at a predetermined distance to the surface wall of the well bore, it is envisaged that the tool body is configured to support several sensors arranged at a number of circumferential locations inside the wellbore such that the properties of thickness, the flow velocity and the dielectric constant of the liquid layer are measured separately or simultaneously.

Figure 4:
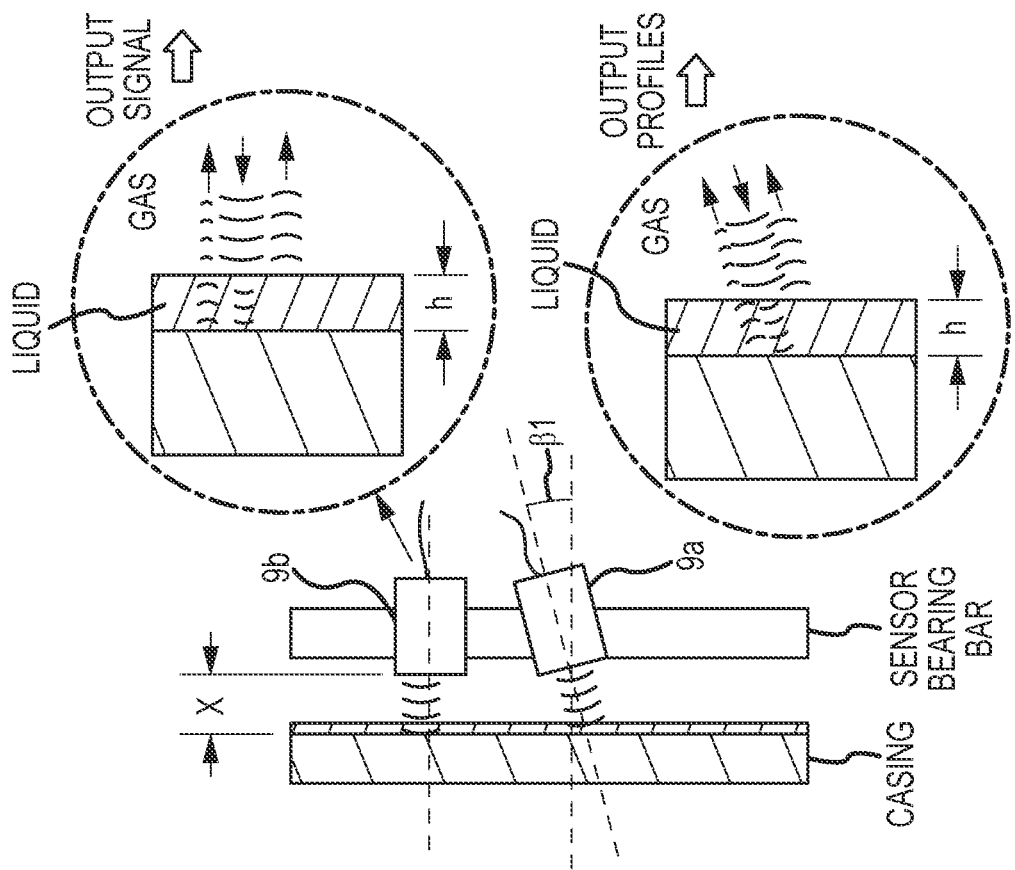
FIG. 4 shows an ultrasonic sensor arranged on a sensor support bar according to an embodiment of the present invention.

FIG. 4 shows ultrasonic sensors 9a, 9b arranged on the support bar according to FIG. 1, sending and receiving a pulsed signal to the surface of the casing wall. Whilst sensor bar 5 and sensors 9a, 9b in FIG. 4 appear to be separate components, it is envisaged that the sensors are integrated within the bar. As can further be understood from FIG. 4, the ultrasonic signals use a normal incidence pulse-echo transducer to obtain measurement that represent thickness, acoustic impedance, speed of sounds as well as density of the liquid annulus, and an inclined incidence transducer based on a pulsed Doppler method to measure the velocity at the gas/liquid interface as well as a velocity profile across the liquid layer.

Figure 5:
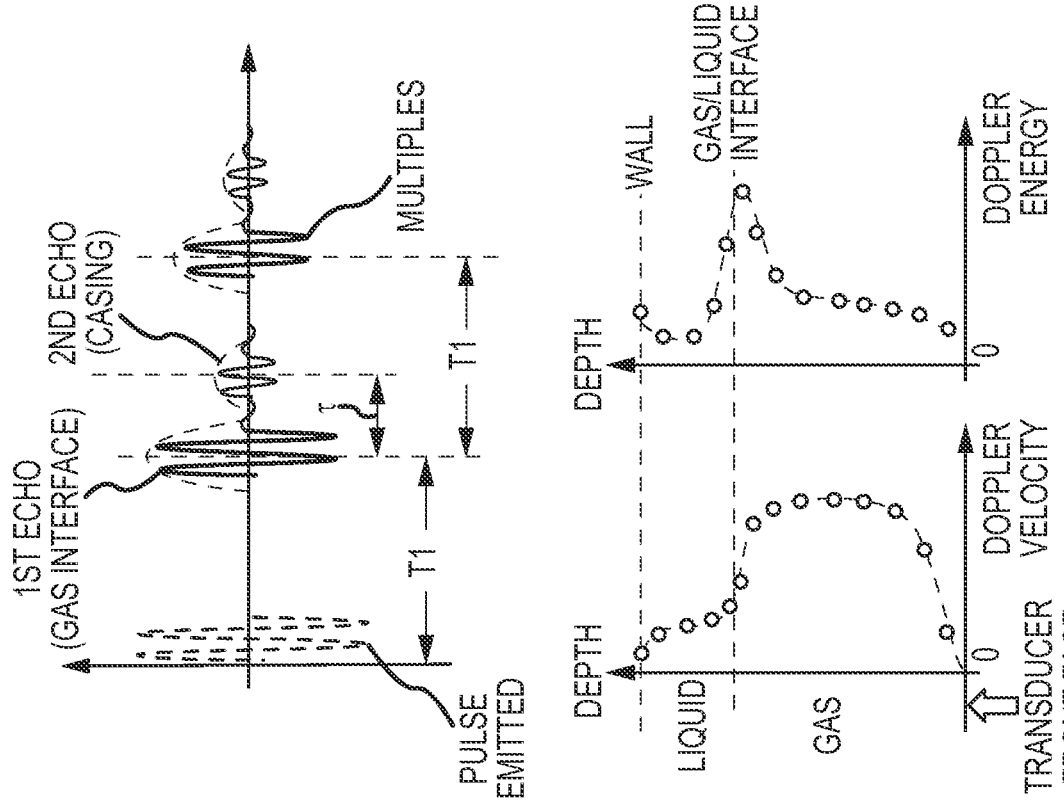
FIG. 5 shows an output signal from the ultrasonic signal of FIG. 4 according to an embodiment of the present invention.

Moreover, as can be further seen in FIG. 4, a pair of ultrasonic transducers is mounted on sensor bar 5. However, the ultrasonic transducers 9a, 9b may be arranged on separate sensor bars. Each transducer emits towards the liquid layer on the surface of the casing, an ultrasonic pulse containing a burst of a few cycles of a signal at a frequency between 1 MHz and 20 MHz, the output signals of which are seen in FIG. 5.

For the first transducer 9a, the designed beam direction is deviated from that of a radial direction by an angle $\beta_1$. The preferred value of the deviation angle is between 5° and 45°. For the second transducer 9b of the pair, the beam incidence angle is normal to the gas/liquid-layer interface, i.e. $\beta_2=0$.

For either transducer 9a, 9b, the emitted ultrasonic pulse travels first through the gas phase between the transducer and the liquid layer, with most energy reflected back at the gas/liquid-layer interface, and with a small portion of the energy continuing to travel through the liquid layer reflecting back at the casing/tubing wall. For the normal incidence transducer 9b the amplitude of the echoes can be determined by the following steps:

The acoustic impedance of an ideal gas is given by equation (1) below:

$$z_g = \rho_{gas} c_{gas} = \frac{M \cdot P}{R \cdot T} \sqrt{\frac{\gamma \cdot R \cdot T}{M}} = \sqrt{\frac{\gamma \cdot M}{R \cdot T}} \cdot P, \quad (1)$$

where c is the speed of sound, $\rho$ is the density, P is the pressure, T is the absolute temperature, $\gamma$ is the adiabatic index, M the molar mass and R the molar gas constant. Thus, the pressure has a dominating effect on the acoustic impedance. For instance at 300 bar and 100° C., if the density of a natural gas such as methane is 150 kg/m³ and speed of sound in gas is 600 m/s, the acoustic impedance, $z_g$, will be 0.09 MRayl. The amplitude reflection coefficient at the gas/liquid interface is then derived by equation (2):

$$R_i = \frac{z_L - z_g}{z_L + z_g}, \quad (2)$$

where $z_L$ is the impedance of the liquid. For water, $Z_L=1.5$ MRayl, the reflection coefficient is $R_i$, =0.89, i.e. after reflection the signal amplitude decreases by about 11%, assuming that all the reflected energy comes back to the transducer. In terms of energy transmission, this means that, at the interface, 79% of the energy ($R^2_i$) is reflected and 21% is transmitted through.

The amplitude transmission coefficient from gas to liquid is given by:

$$T_{p1} = \frac{2 \cdot Z_L}{Z_L + Z_g}. \quad (3)$$

The amplitude transmission coefficient from liquid to gas, for returning echoes, is given by:

$$T_{p2} = \frac{2 \cdot Z_g}{Z_L + Z_g}. \quad (4)$$

Because $z_L \gg z_g$, using the P and T values mentioned above, the transmitted pulse amplitude into the liquid layer is about $T_{p1}=1.89$ times that of the pulse before hitting the interface from the gas side. Assuming the reflection coefficient at the casing wall is which is normally greater than 0.93, the reflected pulse passes again at the liquid/gas interface with a transmission coefficient of $T_{p2}=0.11$. The combined amplitude change factor of the second echo is thus $T_{p1} \times R_C \times T_{p2} \approx 0.2$, ignoring the propagation loss inside the thin liquid layer. This means that if the pulse amplitude before reaching the interface is $p_0$, the first echo from the gas/liquid interface has amplitude of $p_1=0.89 p_0$, the second echo has amplitude about $p_2 \approx 0.2 \times p_0$. In this case the ratio of $p_2/p_1$ is about 0.24 and the higher the gas pressure the greater is this ratio and more detectable is the second echo.

The liquid layer thickness can be measured by combining the time difference between the pulse emission and first echo return, $T_i$, with transducer stand-off gap, x, which is known from the tool design, i.e.

$$h = x - T_1 \cdot c_m / 2, \quad (5)$$

where $c_m$ is the speed of sound in gas, which can be determined by a separate measurement, for instance, by using an ultrasonic pulse echo transducer, 20, and a reflector target, 21, which can be installed on the support of the sensor bearing arm, or on the tool body, as shown by the embodiment described with reference to FIG. 1.

The speed of sound (sos) measured in the wet gas phase, $c_m$, can also be used to derive the concentration of the liquid droplets, $\alpha$, via the Wood Equation:

$$C_m^2 = \frac{\rho_L c_L^2 \rho_g c_g^2}{[\alpha \rho_g c_g^2 + (1-\alpha)\rho_L c_L^2][\alpha \rho_L + (1-\alpha)\rho_g]}, \quad (6)$$

where $\rho_L$ and $c_L$ are the density and the sos for the liquid phase, and $\rho_g$ and $c_g$ those for the dry gas phase. These parameters may be determined through sampling and PVT corrections.

If the second echo from the casing/tubing wall is detectable, then the time difference between the first and the second echo, $\tau$, is determined by:

$$\tau = 2h/c_L \quad (7)$$

where $c_L$ is the speed of sound in liquid that may have different values depending on the mixing ratio of water and condensate/oil. With a measured time-of-flight, τ, and a measured h from Eq.(5), the value of $c_L$ can be obtained.

For condensate/oil, the density is in the range of 500~800 and if a speed of sound around 1300 m/s is assumed, then the acoustic impedance of condensate/oil is at least 50% lower than that of water. Therefore, the acoustic impedance of the liquid phase may be obtained from the amplitude ratio of the two echoes mentioned previously, i.e.:

$$\epsilon_p = \frac{R_i}{T_{p1}T_{p2}R_c} = \frac{Z_L^2 - Z_g^2}{4Z_L Z_g R_c}. \quad (8)$$

Knowing $\epsilon_p$, $Z_g$ and $R_C$, the acoustic impedance of the liquid, $Z_l$, can be obtained from (8). The density of the liquid phase can be determined from:

$$Z_L = \rho_L c_L \quad (9)$$

where $C_L$ is derived from Eq. (6). From the derived density $\rho_L$, the water-in-condensate/oil mixing ratio, α, can be obtained by using an appropriate mixing law. For a homogeneous mixture, a linear mixing law may be used to estimate α:

$$\rho_L = (1-\alpha)\cdot\rho_c + \alpha\cdot\rho_w, \quad (10)$$

where $\rho_w$ is the density in water and $\rho_c$ is that in condensate/oil, both may be estimated according to field sample data. Therefore with a measured $\rho_L$, the value of a (WLR) can be calculated from Eq. (8).

Thus, the inclined ultrasonic transducer 9a performs a range gated Doppler velocity profile measurement and the flow velocity at the gas/liquid-layer interface can be measured since the interface produces a large amplitude echo, and hence good signal to noise ratio. A theoretical/empirical liquid velocity profile may then be used, between the measured interface velocity, $V_{il}$ and that at the wall, i.e. $V_{wall}=0$, to estimate the flow rate of the liquid annulus. If there is a sufficient amount of scatterers in the liquid layer, e.g. solid particles, then the actual velocity profile in the layer can be measured and used to estimate the flow rate as seen in FIG. 4. For non-axi-symmetric liquid layer thickness distributions, which is likely to be the case in deviated wells, i.e. wells which are purposely deviated from the vertical, by drilling at controlled angles to reach an objective location other than directly below the surface location, the arrangement of the sensor bars seen for example in FIG. 1 allow several measurements at different circumferential locations to be made and combined to derive the average flow rate of the liquid annulus.

Figure 6:
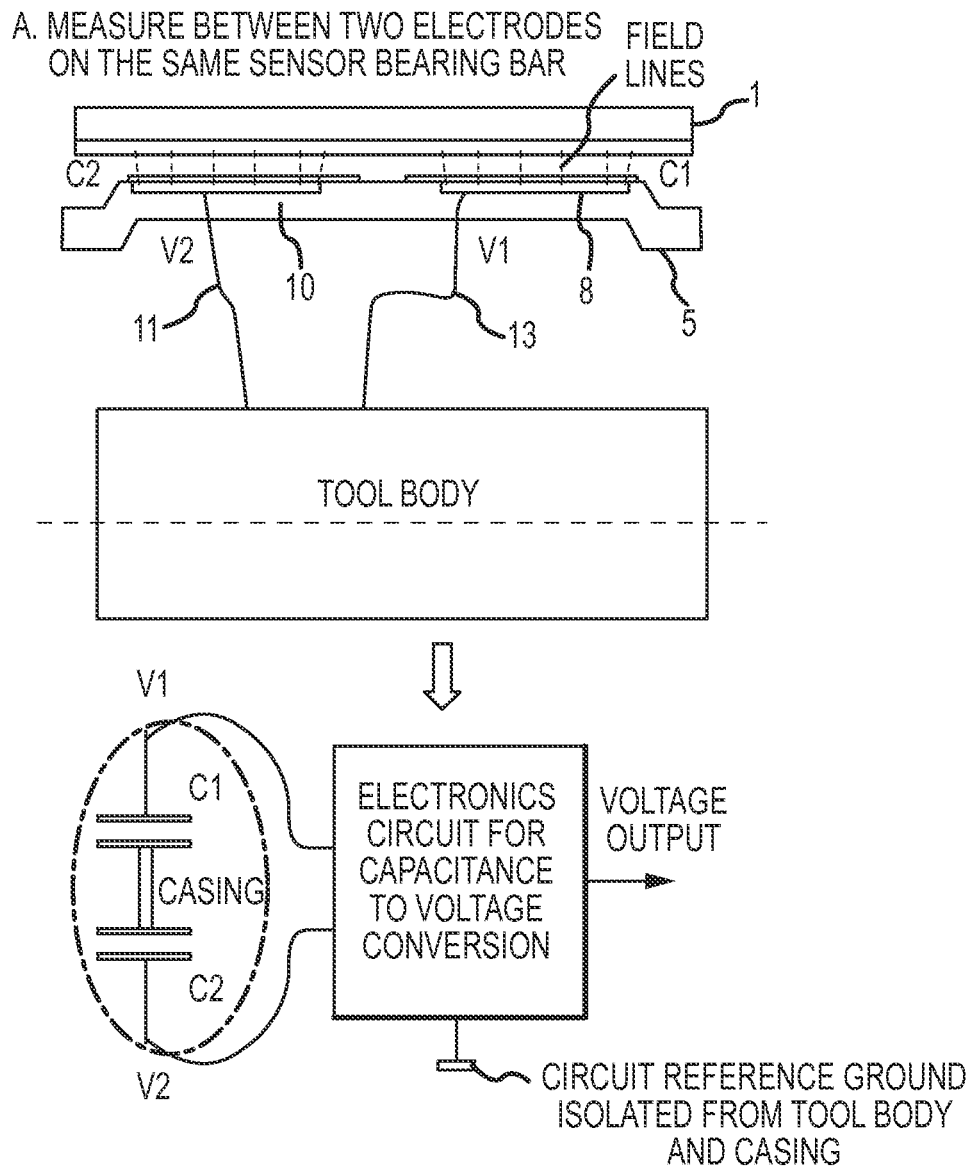
FIG. 6 shows an arrangement of two electrodes on the same sensor carrying arm providing a capacitance measurement according to an embodiment of the present invention.
Figure 7:
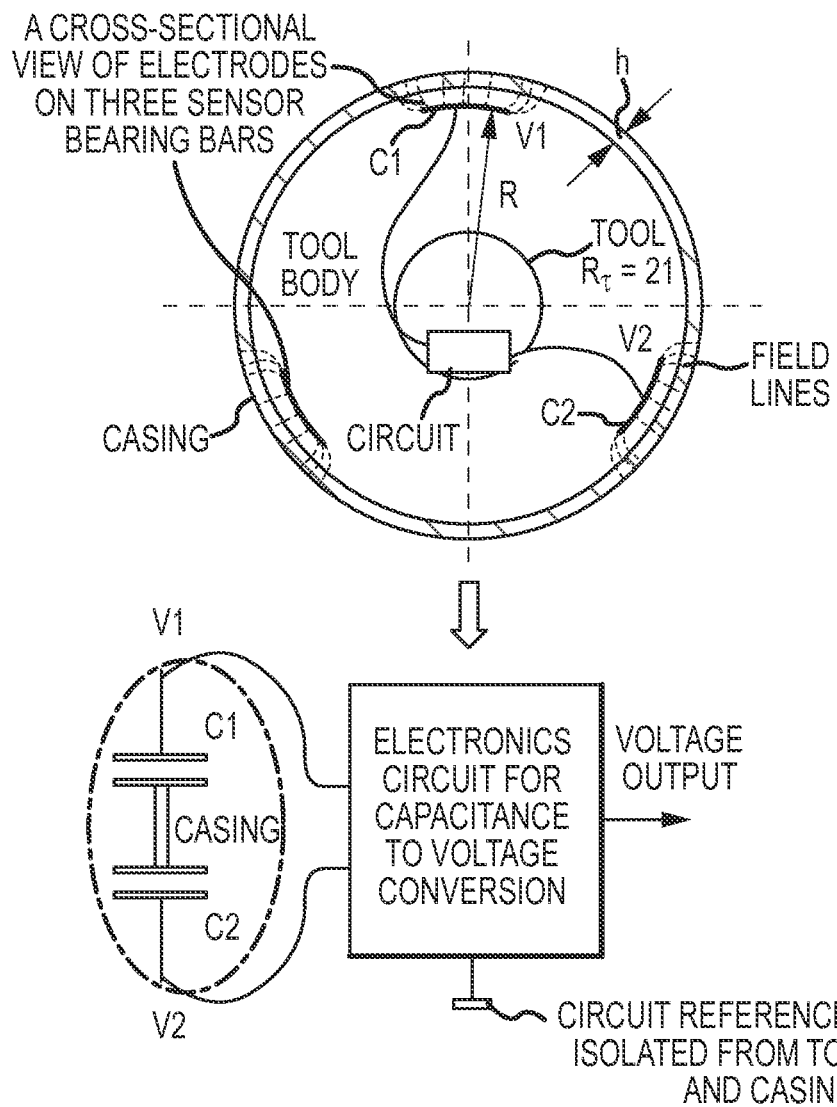
FIG. 7 shows an arrangement of capacitance electrodes arranged on separate same sensor carrying arms of which any combination of two electrodes can be selected to form a capacitance measurement according to an embodiment of the present invention.

Referring now to FIG. 6, in which an arrangement of two electrodes are arranged on the same sensor bar providing a capacitance measurement for processing by the electronic instrumentation circuitry housed in the tool body. As can be understood, the capacitance sensors having an insulation coating, each of which consists of a first capacitance electrode $C_1$ and a second capacitance electrode $C_2$, and arranged a predetermined distance from the surface of the casing by means of the interval means such as a wheel of a predefined radius. In particular, the sensing area of the sensors is facing casing surface. Whilst the two sensors are depicted arranged on the same sensing bar, FIG. 7 depicts the sensors arranged on different sensing bars, which will be discussed later. The sensors may form part of the sensor bar, or may be added to the bar depending on the requirements and characteristics of the well. The connection between the sensors and the electronic instrumentation circuitry is by cables 11, 13 attached to the sensor carrying arm 3, 7.

As can be understood by the arrangement of the tool body and the sensor carrying arms, the gap or distance between the sensing side of the capacitance electrode having an insulation coating is typically in the range of a few millimeters. The gap, $d_x$, between the sensing side and the surface of the wall minimizes the risk of contacting the sensors against the wall. When the appropriate capacitance electrode is arranged very close to the casing surface, and if the "edge effect" of the capacitors is neglected, and the capacitance therebetween can be approximately described by that of a parallel capacitor:

$$C = \frac{\varepsilon_0 \varepsilon_r A}{d_x}, \quad (11)$$

where $\epsilon_0$ is the permittivity for vacuum, $\epsilon_r$ the dielectric constant, A the electrode area and $d_x$ the gap size. Thus, the sensitivity of a parallel plate capacitance sensor to the dielectric property change is proportional to $1/d_x$.

Merely by way of example, the gap or distance size may be of the order in some aspects of between 2 mm to 5 mm, although in some cases this may be increased to 10 mm. For the other electrode dimensions, the axial length of a capacitance electrode is limited by the length of the sensor bar and the number of electrodes on the bar, and in some aspects may range from 10 mm to 200 mm. Further, the electrode width in the circumferential direction as seen in FIG. 6 is limited by the size of the logging tool, on which it is carried, in some aspects ranging from 10 mm to 35 mm. The curvature of the electrode may range from a radius R of the order of 10 s of millimeters. In some aspects R may range from about 20 mm to R=Rc, where Rc is the radius of the casing.

Further depicted in FIG. 6 is the use of the well casing as a central conductor between the first capacitance electrode and the second capacitance electrode. The capacitance is measured between the first capacitance electrode and the second capacitance electrode arranged by means of the tool and the surface of the casing. However, to ensure a reliable electrical connection to the casing, a non-contact configuration is ensured. Whilst the capacitance measuring electronics circuit on the tool is connected with the first capacitance electrode and the second capacitance electrode, the capacitance between them is not measured directly. That is, the electrodes and the casing form a three-conductor arrangement capacitor, whose capacitance value equals that of the two capacitors, $C_1$ and $C_2$, connected in series. In effect, the metal casing functions as the central conductor in the arrangement, as shown in FIG. 6.

FIG. 7 elaborates on the use of a first capacitance electrode and the second capacitance electrode by measuring capacitance between two electrodes carried by separate sensor bars which have an equivalent circuit to that in FIG. 6. However, the value of $C_2$ may differ if the liquid annulus is not axi-symmetric. Of course, by deploying the sensors in either of FIGS. 6 and 7 with the ultrasonic sensors discussed with FIG. 4 allows the production logging tool to perform measurements at several circumferential locations around the wellbore, which would obtain an average value representative of the wellbore flow.

Figure 8:
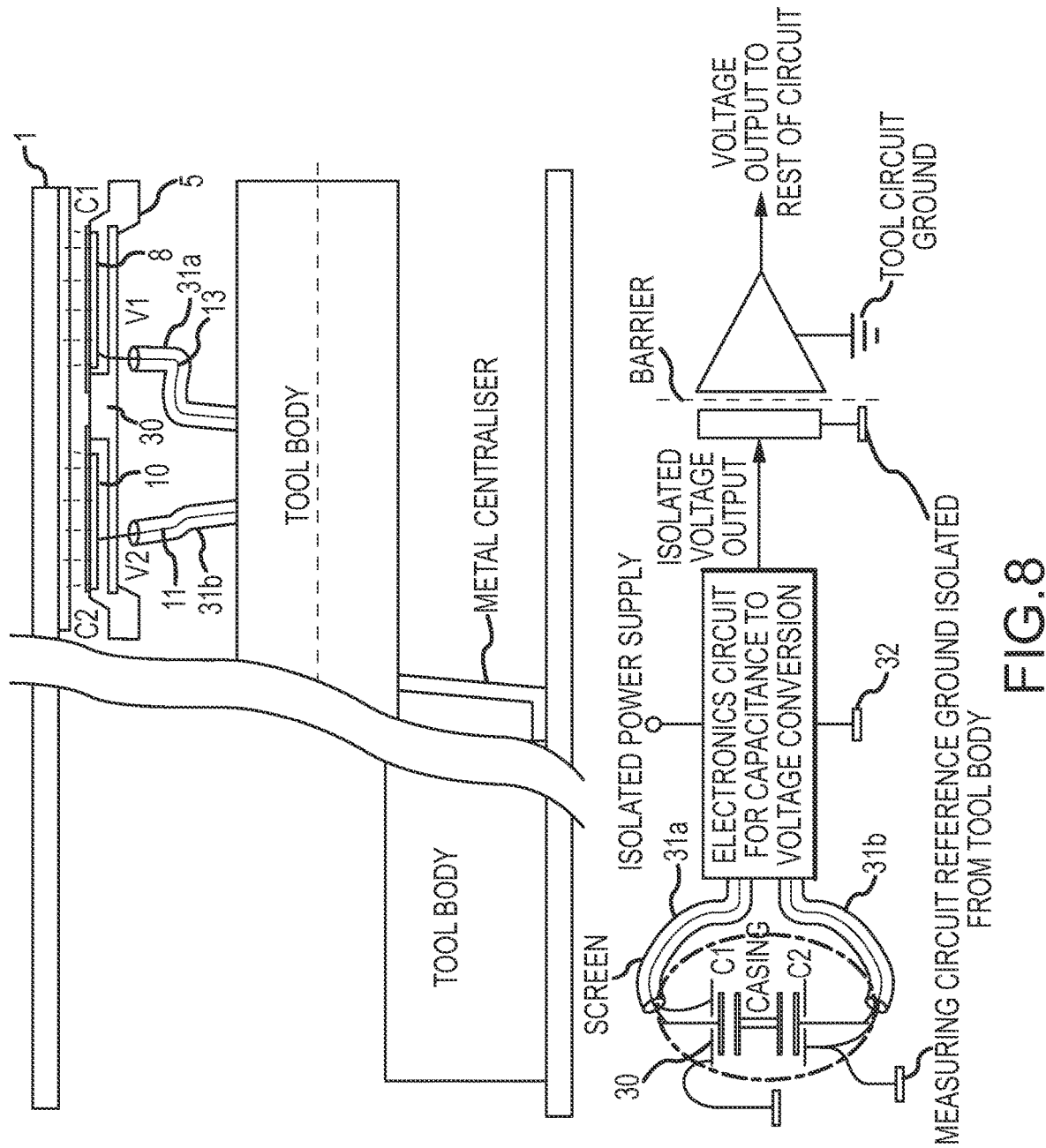
FIG. 8 shows an optional circuit arrangement of the invention, such that contact of the metal tool body with the casing, either directly or via a centraliser, will not affect the capacitance measurement described in an embodiment of the present invention.

FIG. 8 depicts an alternative configuration of a capacitance measurement technique capable of being deployed on the tool body of the present invention. As can be understood, reference ground 32 of the measurement circuit is electrically isolated from the tool circuit ground which is typically the metal body of the tool which may contact the casing wall at some point along its length i.e. through a metal centralizer (as seen in FIG. 8).

Further, the power supply of the measurement circuit is isolated from other power supplies in other parts of the tool with the output coupled to other parts of the on-tool circuit system via an isolation amplifier. In addition to the isolation considerations discussed, FIG. 8 also shows that a metal electrical guard or screen 30 as well as cable screens 31a, 31b reduce unwanted stray capacitances between the electrodes and the tool body and those directly between the measuring electrodes. Cable screens 31a, 31b are all electrically connected to the reference ground of the measuring circuit 32. In other words, the guards or screens connected to the isolated reference ground, are used to screen the non-active surfaces of the electrodes and connections wires of the measuring electrodes to reduce stray capacitances of the measurement system.

The guard or screen 30 may be combined with a stray-immune capacitance measuring circuit to produce a capacitance measurement minimizing the effect of the capacitance between the electrodes and their screen or minimized. Typically, a voltage $V_1$ is applied to the first electrode and a virtual ground voltage $V_2$, where $V_2$ is approximately 0V (with respect to the isolated circuit ground potential), is applied to the second electrode. The current flowing through the series capacitance of $C_1$ and $C_2$ is then measured. Furthermore, an isolation amplifier may be used to couple the output voltage of the measuring circuit to the other circuitry in the measurement circuitry whose reference ground is typically the tool body.

In other words, the capacitance between a first capacitance electrode and the second capacitance electrode, and the casing wall is measured by the electronic instrumentation circuitry. An electrical connection may be made between the electrodes and the circuit which applies a first voltage $V_1$ to, for example, the first electrode and a different voltage $V_2$ to the remaining electrode. Current flowing in between the first and second electrodes is measured, whilst the reference ground of the circuit is electrically isolated from the casing wall and from the metal body of the downhole measurement tool during the measurement.

As will be discussed later, the measured capacitance may be combined with the liquid annulus layer thickness measured by ultrasonic sensors to obtain permittivity of the liquid and the liquid type, i.e. water-continuous or oil-continuous.

FIGS. 9 and 10 show the results of a simulation of the capacitance measured between two electrodes versus layer thickness of different liquids using a numerical model based finite element methods and analytical model based on an integral equation method.

In FIG. 9, the characteristics of the liquids are oil ($\in$=2.1), water ($\in$=80) and salt water (conductor), with a 15 mm circumferential width, 150 mm axial length, a curvature of R=75 mm and a casing-electrode gap of 8 mm.

Using comparative parameters, except a casing-electrode gap reduced from 8 mm to 4 mm, the results on FIG. 10 show a significant improvement of sensitivity when the gap changes from 8 mm to 4 mm.

FIG. 11 shows a response of a capacitance sensor versus the water-in-liquid ratio assuming that the space between the electrodes is filled with a homogeneous oil/water mixture. At a certain water-in-liquid ratio, typically between 35%~65%, an oil continuous liquid becomes a water-continuous one and the inversion of the continuous phase occurs. In a low frequency capacitance measuring circuit, for example 100 kHz, a water continuous liquid acts as a conductor, as in the single-phase water case. Therefore, the capacitance value increases monotonically as the water-in-liquid ratio rises up to the phase inversion point, above which it stays at the saturation level for all water continuous liquid mixtures, regardless of the water-in-liquid ratio value. If the liquid is water or water continuous and its layer is sufficiently thick, then the capacitance measurement can identify the liquid type because the measured capacitance value exceeds that of the maximum possible thickness of an oil-continuous liquid layer. However, by using the ultrasonic sensor described with reference to FIG. 5, that is, to obtain an independent thickness measurement, the liquid layer is precisely characterized. Such a configuration allows the measured capacitance value to define the dielectric property of the liquid layer from models depicted by FIG. 9 or 10.

In another embodiment of the present invention as described in relation to FIG. 12, the dielectric and acoustic properties of the liquid layer are measured to overcome the attenuation or uncertainty caused by the presence of the gas/liquid interface. FIG. 12 shows a contact sensor bar providing an ultrasonic delay-line 62 and capacitance electrodes 51a, 51b in contact with liquid implemented by a gap of several hundred microns between the sensors and the casing.

That is, a calibration sensor bar may be added to the tool string having a similar sensor arrangement to that shown in FIG. 1. However, compared with that in FIG. 1, the calibration sensor bar 42 may have a much shorter length in the axial direction and is placed much closer to the casing surface 1, by means of a second wheel 41a, 41b. That is, the radius of the wheel in the present embodiment differs compared to that in the embodiment of FIGS. 1-3 such that the gap between the sensor surfaces and the casing surface is in the range of 0.25 mm to 0.5 mm, allowing the gap to be filled with liquid some or most of the times. In the present embodiment, the wheel may optionally be arranged on either the distal end of the third sensor carrying arm or the fourth sensor carrying arm or both third and fourth sensor carrying arms. As in the configuration seen in FIGS. 1-3, the calibration sensor bar may be similarly deployed by the support arm consisting of support 40a, 40b, guide wheels 41a and 41b, and sensor bearing bar 42.

The calibration bar uses the ultrasonic impedance measurement to identify liquid contact periods and to select ultrasonic and capacitance measurements corresponding to such periods for density, dielectric constant and water-in-liquid ratio determination. The measured ultrasonic and dielectric properties of the liquid are combined with the measurements from sensors that perform measurements through a layer of gas to derive flow rates of liquid, water and oil/condensate.

For capacitance measurement, the surfaces of the two electrodes, 51a, 51b may be protected by an isolation coating or cover layer, for example two thin plates 50a, 50b of a hard material such as Sapphire, which will not be damaged by occasional contact with an un-even surface of the casing. The screens or guards 52a, 52b and connecting wires 54a, 54b and their cable screens, 53a, 53b are all of a similar design to those shown in FIG. 8.

In operation, the emitted pulses from the ultrasonic transducer 60 travels through a delay-line 62 which is made of a solid material such as stainless steel. At the solid/liquid interface, part of the pulse energy is reflected according to the reflection coefficient of the interface, as defined by $$R_r = \frac{Z_L - Z_s}{Z_L + Z_s} \quad (12)$$

where $Z_L$ the acoustic impedance of the liquid and $Z_s$ that of the solid delay line, which is known. The reflection coefficient, $R_r$, can be derived from the amplitude ratio of two echoes (multiples, in same colour in FIG. 8) at this interface. Knowing $R_r$ and $Z_s$, $Z_L$ can be derived from Eq. (12). The pulse energy that travels through the liquid layer will get reflected back at the casing/tubing wall, producing a second echo (in green in FIG. 8) shortly after the first. The time delay $T_x$ is measured and the speed of sound of the liquid layer can be determined from:

$$C_L = 2\delta/T_x \quad (13)$$

where $\delta$ is the gap between the delay line surface and the casing/tubing wall, which is a design parameter. The density of the liquid can be calculated from Equation (9) by knowing $C_L$ and $Z_L$ and the water-in-liquid ratio can be derived from a mixing law such as Equation (10). The ultrasonic transducer 60 is selected as operating in high frequency, preferably in the range of 5~20 MHz, which is connected to the electronic instrumentation circuitry on the tool via cable 61.

The measured acoustic impedance by the ultrasonic transducer provides an indicator for whether or not the gap is filled with the liquid. Only during the liquid filled intervals, the ultrasonic and capacitance measurement results are used for derivation of the liquid properties. The measured capacitance, $C_m$, during the liquid filled intervals can be expressed by:

$$C_m = \frac{C_i C_x}{C_i + C_x} \quad (14)$$

where $C_j$ is the capacitance of the insulation layer if there is one, and $C_x$ the capacitance of the liquid layer. The dielectric constant of the liquid can be derived by combining Equation (11) with Equation (14):

$$\varepsilon_L = \frac{C_i C_m}{K(C_i - C_m)} \quad (15)$$

where K is a constant determined by the electrode area and the gap size between the electrode and the casing. For oil-continuous flows, a mixing law, such as a simple one described by Eq. (10), can be used to derive the water-in-liquid ratio from $\in_L$.

In another configuration, the capacitance sensors may be used to measure the velocity of the liquid annulus, by using two identical pairs of capacitance electrodes along the axial direction of the sensor bearing arm, i.e. a duplication of the basic capacitance sensor structure shown in FIG. 6 on a sensor arm with extended length. A cross-correlation of the capacitance signal measured upstream with that measured downstream produces the velocity of the gas/liquid interface may be interpreted to obtain an average liquid layer velocity. With such a system, the ultrasonic Doppler sensor described above may be omitted to simplify the tool design.

In another embodiment of the present invention, the measurement generated from each of the sensors e.g. ultrasound, capacitance and calibration sensor may be combined to derive the flow information of the liquid annulus of a well bore, as shown in FIGS. 13 and 14. That is, the average liquid annulus thickness at a downhole location is determined using the ultrasonic Doppler sensor arranged as described in relation to FIG. 1. A measured velocity of the gas/liquid interface and estimated flow rate of the liquid annulus is further determined using the ultrasonic Doppler sensor. Next, identification of the water-continuous or oil-continuous liquid layer is made using the capacitance sensor in combination with ultrasonic measured thickness. For oil-continuous liquid, the water-in-liquid ratio of the liquid layer is determined using a combination of the capacitance sensor with ultrasonic measured thickness. For water-continuous liquid, the water-in-liquid ratio of the liquid layer is determined using the ultrasonic impedance, speed of sound and density measurements of the liquid layer. Finally, the liquid flow rate, water flow rate and oil flow rate are determined using a combination of ultrasonic, capacitance measurements with appropriate mixing laws and annular flow models, and/or with direct measurements such as those by a full bore spinner and speed of sound sensors.

While the principles of the disclosure have been described above in connection with specific apparatuses and methods, it is to be clearly understood that this description is made only by way of example and not as limitation on the scope of the invention.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions and alterations herein without departing from the spirit and scope of the present disclosure.

What is claimed is:

1. A downhole annular flowmeter tool for determining the flow rate of an annular or near annular liquid flow in a wellbore, where said wellbore comprises a casing having a first surface, said tool comprising:
   at least one sensor carrying arm adapted to extend from a tool body to support at least one sensor support bar having a second surface, wherein:
   the second surface of the sensor support bar is configured when in use to be disposed at a predetermined distance opposite from the first surface of the casing, and
   the second surface of the sensor support bar is configured to carry a plurality of sensors that sense physical properties, including at least one of electrical properties or acoustic properties of a liquid annulus formed on the first surface, at spatial locations close to the annulus, and
   a radially outermost portion of the sensors is separated from the first surface by a gap.

2. The tool according to claim 1, wherein the first surface of the casing and the second surface of the sensor support bar are arranged parallel to each other.

3. The tool according to claim 1, wherein the sensor carrying arm comprises a proximal end movably fixed to the tool body and adapted to extend when the tool is inserted into the wellbore, and a proximal end adapted to attach to the at least one sensor support bar.

4. The tool according to claim 1, wherein the sensor support bar is arranged between a distal end of a first sensor carrying arm and a distal end of a second sensor carrying arm extending from the tool body.

5. The tool according to claim 4, wherein the distal end of each of the first sensor carrying arm and the second carrying arm comprises at least one wheel of exact same dimensions to maintain the sensor support bar at a parallel distance determined by a radius of the wheel.

6. The tool according to claim 4, wherein the at least one wheel rotates about an axle point arranged on the arms, the axle point being at a predetermined distance to the first surface of the casing.

7. The tool according to claim 1, wherein at least one sensor of the plurality of sensors is arranged on the sensor support bar a predetermined distance from the first surface of the casing.

8. The tool according to claim 7, wherein the predetermined distance of the at least one sensor from the first surface of the casing is in a range of about 2 mm to about 10 mm, such distance defined by a distal end of a first sensor carrying arm and a distal end of a second sensor carrying arm.

9. The tool according to claim 1, wherein at least one sensor of the plurality of sensors is integrated within the sensor support bar.

10. The tool according to claim 1, wherein the tool comprises a plurality of sensor carrying arms for supporting a plurality of sensor support bars.

11. The tool according to claim 1, wherein the predetermined distance between the first surface of the casing and the second surface of the sensor support bar is determined by at least one interval means which is arranged on a distal end of the at least one sensor carrying arm.

12. The tool according to claim 11, wherein the interval means is a first wheel which is adapted to engage the first surface of the casing when the at least one carrying arm is in an extended position.

13. The tool according to claim 12, wherein the first wheel is adapted to rotate when the at least one carrying arm is in the extended position and when the tool traverses through the wellbore.

14. The tool according to claim 12, wherein the predetermined distance between the first surface of the casing and the second surface of the sensor support bar is constrained by a radius of the first wheel.

15. The tool according to claim 11, wherein the interval means is a protrusion which extends from the distal end of the at least one carrying arm.

16. The tool according to claim 1, wherein the tool is fixedly attached to a production logging tool string.

17. The tool according to claim 1, wherein the length of the tool body is approximately of the order of 0.5 to 1.5 meters.

18. The tool according to claim 1, wherein the tool body comprises a control unit for analyzing the data from the at least one sensor and further a transceiver for bi-directional communication with a control station on a well surface.

19. The tool according to claim 1, wherein the at least one sensor carrying arm is maintained at a predetermined and constant distance relative to the first surface of the casing by an actuating signal from a CPU of an electronic instrumentation circuitry positioned within the tool body or at a control station on a well surface such that the sensors are adaptively manipulated to be at a constant distance to the first surface of the casing.

20. The tool according to claim 1, wherein the plurality of sensors includes at least one ultrasonic transducer or at least one capacitance sensor.

21. The tool according to claim 20, wherein the at least one ultrasonic transducer is adapted to emit towards a liquid layer on the first surface of the casing a pulse to define an echo signal having an amplitude that travels through a gas phase between the transducer and the liquid layer.

22. The tool according to claim 21, wherein the amplitude of the echo signal is used by a CPU of an electronic instrumentation circuitry positioned within the tool body or at a control station on a well surface, the CPU adapted to determine a thickness of the liquid layer on the first surface of the casing.

23. The tool according to claim 1, wherein the plurality of sensors comprising an electrically insulating layer facing the first surface of the casing.

24. The tool according to claim 23, wherein the at least one sensor comprises two capacitance sensors deployed on the at least one sensor support bar, wherein the at least one sensor support bar is arranged a distance from the first surface of the casing.

25. The tool according to claim 1, wherein the plurality of sensors includes at least one capacitance sensor that consists of two capacitor electrodes arranged on the same sensor carrying arm.

26. The tool according to claim 25, wherein the two capacitor electrodes are arranged on separate carrying arms.

27. The tool according to claim 1, wherein a capacitance between the at least one sensor support bar and the first surface of the casing is indirectly measured by forming a capacitance measuring circuit comprising a three conductor sandwich capacitor whose capacitance value is equal to a first capacitor and second capacitor connected in series arranged on the sensor support bar.

28. The tool according to claim 27, wherein the first surface of the casing is adapted to function as a central conductor in the three conductor sandwich capacitor.

29. The tool according to claim 27, wherein a reference ground of the capacitance measuring circuit is electrically isolated from a tool ground of the tool body, wherein the tool body is a metal body.

30. The tool according to claim 1, further comprising a calibration sensing means comprising at least one sensor and further comprising a third surface, the calibration sensing means arranged between a distal end of a third sensor carrying arm and a distal end of a fourth sensor carrying arm.

31. The tool according to claim 30, wherein a distance between the distal end of the third sensor carrying arm and the distal end of the fourth sensor carrying arm is less than a distance between the distal end of the first sensor carrying arm and the distal end of the second sensor carrying arm.

32. The tool according to claim 30, wherein a distance between the distal end of the third sensor carrying arm and a distal end of the fourth sensor carrying arm defines a gap in the range of about 0.25 and 0.5 mm between the sensor support bars of the third and fourth sensor carrying arms and the first surface of the casing such that the gap is filled with liquid.

33. The tool according to claim 30, wherein the calibration sensing means is adapted to measure ultrasonic impedance values to identify liquid contact and to select ultrasonic and capacitance measurements to determine values of density, dielectric constant and water-in liquid ratio.

34. The tool according to claim 33, wherein the measured values of ultrasonic and dielectric properties of the liquid are used by a CPU of the electronic instrumentation circuitry or a control station, the CPU adapted to combine the measurements from the measurements of liquid flow rates, water and oil/condensate derived by sensors deployed on any of the sensor support bars.

35. The tool according to claim 30, wherein a predetermined distance between the first surface of the casing and the third surface is determined by at least one interval means which is arranged on the distal end of the third sensor carrying arm or the distal end of the fourth sensor carrying arm.

36. The tool according to claim 35, wherein the interval means is a wheel adapted to engage the first surface of the casing when the third sensor carrying arm or the fourth sensor carrying arm is in an extended position, and further wherein the wheel rotates about an axle point arranged on said arm, the axle point being at a predetermined distance to the first surface of the casing.

37. The tool according to claim 35, wherein the interval means is a second wheel which is adapted to rotate when the third sensor carrying arm or the fourth sensor carrying arm is in the extended position and when the tool traverses through the wellbore.

38. The tool according to claim 37, wherein the predetermined distance between the first surface and the third surface is constrained by a radius of the second wheel being less than the distance between the first surface and the second surface.

39. The tool according to claim 1, wherein the at least one sensor carrying arm is maintained at a predetermined and constant distance relative to the first surface of the casing.

* * * * *